April 9, 1929.　　　　　O. BUYS　　　　　1,708,292
PROTECTING DEVICE FOR ELECTRICAL CABLE CONNECTIONS
Filed March 14, 1923　　　2 Sheets-Sheet 1
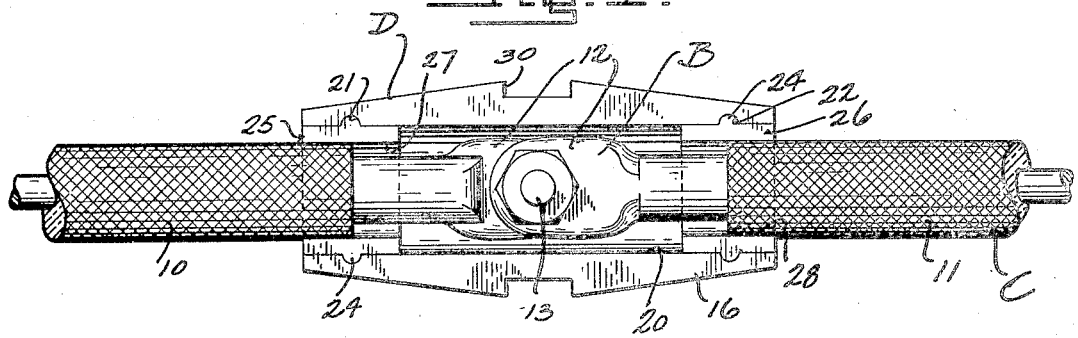
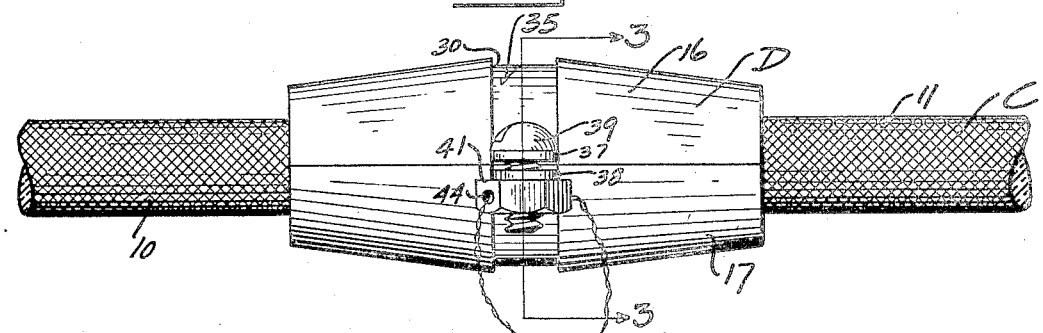
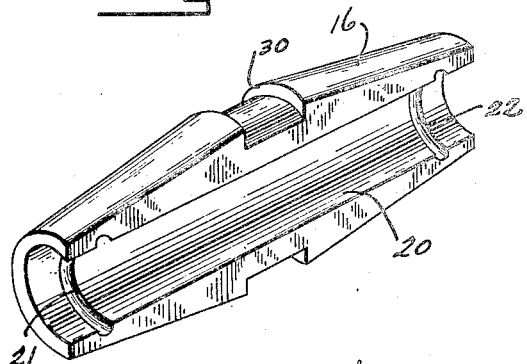
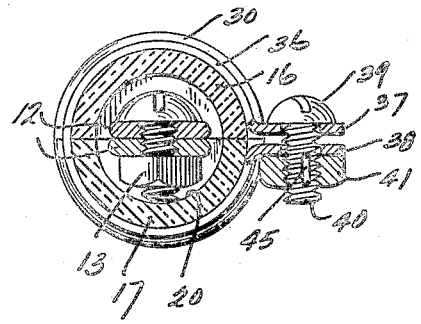
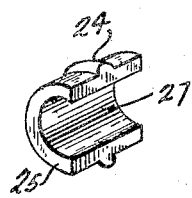
Inventor
Orville Buys.
By Lancaster and Allwine
Attorneys

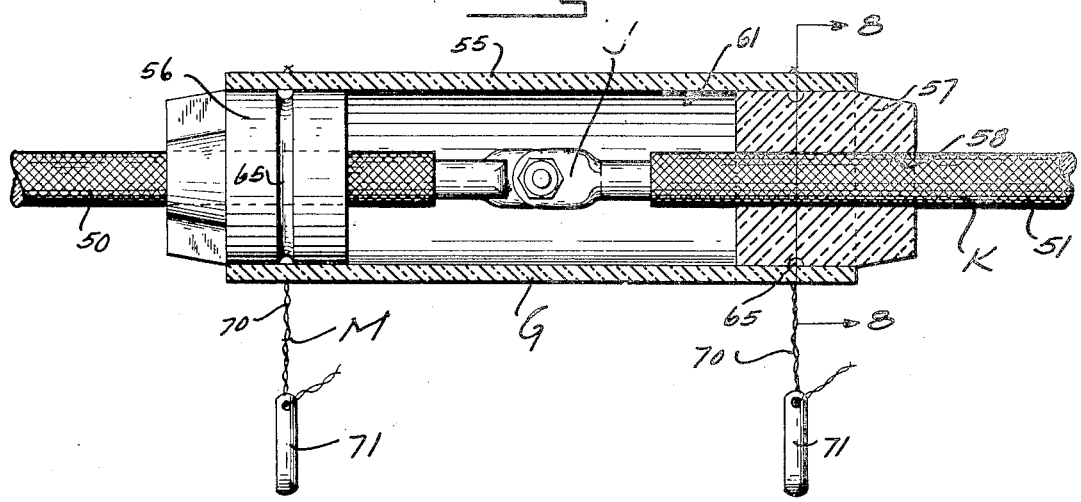
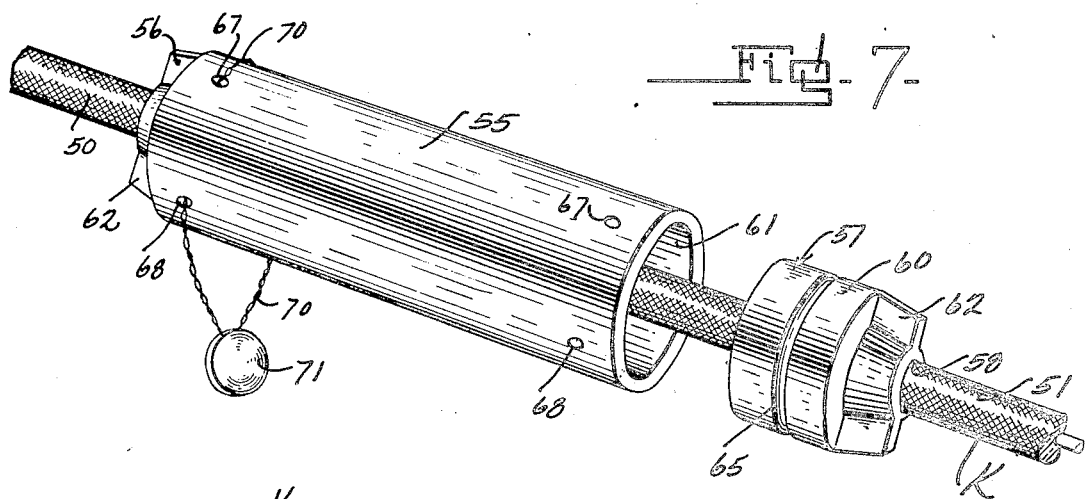
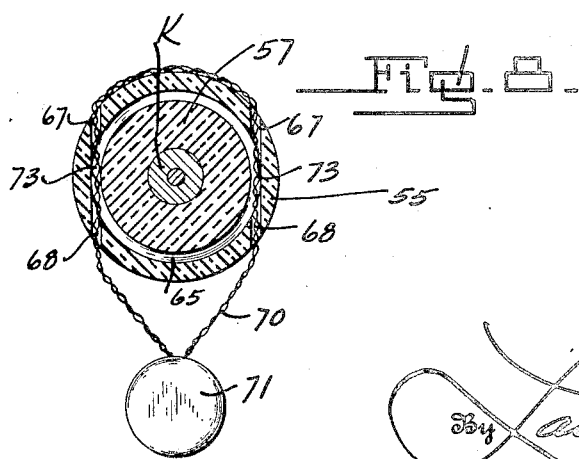

Patented Apr. 9, 1929.

1,708,292

UNITED STATES PATENT OFFICE.

ORVILLE BUYS, OF PITTSBURGH, PENNSYLVANIA.

PROTECTING DEVICE FOR ELECTRICAL CABLE CONNECTIONS.

Application filed March 14, 1923. Serial No. 625,014.

This invention relates to improvements in protecting devices for electrical cable connections.

The primary object of this invention is the provision of housing means for electrical cable connections so sealed as to prevent unauthorized tampering with the cable connection.

A further object of this invention is the provision of an insulating housing for electrical conductor connections embodying an arrangement of parts whereby the same may be installed with ease, and properly sealed so that unauthorized tampering with the same may be readily detected.

Other objects and advantages of this invention will be apparent during the course of the following detailed description.

In the accompanying drawings, forming a part of this specification, and wherein similar reference characters designate corresponding parts throughout the several views—

Figure 1 is a fragmentary side elevation of the improved protecting device, showing the manner in which the same is disposed over a connection of two electrical cables.

Fig. 2 is a side elevation of the improved and preferred form of protection device, showing clamping and sealing features thereof.

Fig. 3 is a transverse cross sectional view taken substantially on the line 3—3 of Figure 2.

Fig. 4 is a perspective view of one part of the housing embodied in the protecting device as illustrated in Figure 1.

Fig. 5 is a perspective view of a segment or part of a novel bushing used with the protecting device.

Fig. 6 is a longitudinal cross sectional view taken through a modified form of insulating covering for electrical conductor connections, showing sealing features thereof.

Fig. 7 is a perspective view of the form of invention illustrated in Figure 6, showing a step preparatory to sealing of an electrical connection.

Fig. 8 is a transverse cross sectional view taken substantially on the line 8—8 of Figure 6.

In the drawings, wherein for the purpose of illustration are shown preferred and modified forms of this invention, the letter B generally designates a connection for the parts 10 and 11 of a cable C; D a housing arrangement for the connector B of the cable C; and E sealing means whereby unauthorized tampering with the housing D or connection B may be readily detected.

The connection B may be of the ordinary type, including the flat apertured shanks 12, connected by means of a clamping bolt and nut means 13 in accordance with conventional practice.

Referring to the protecting device the housing D of the same preferably includes the parts 16 and 17 which are of identical construction, and when placed together provide the cylindrical shaped passageway 20 adapted to house the connection B therein. At the end of the housing D the parts 16 and 17 are provided with annular grooves 21 and 22 adapted to receive therein the annular convex ribs or projections 24 of bushings 25 and 26 respectively; each of said bushings being of two part construction to conform to the parts 16 and 17 of the housing D, as can well be understood.

The bushings 25 and 26 are provided with openings 27 and 28 therein adapted to receive the parts 10 and 11 of the cable C therethrough, and preferably in snug abutting relation with the insulation covering of said cable parts 10 and 11, substantially after the manner illustrated in Figure 1 of the drawings.

Intermediate its ends the housing D of the improved protecting device is annularly grooved, as at 30, and from which annular groove the parts 16 and 17 are exteriorly tapered in converging relation toward the ends thereof. Clamping means 35 is preferably provided for the annular groove 30, which includes a clamping band 36 of some springy resilient metal, the ends of which radially outstand therefrom, and are apertured for detachably receiving a clamping bolt or screw element 39. The band 36 is of course to be positioned in the annular groove 30 of the housing parts 16 and 17, with the ends 37 and 38 thereof outstanding in adjacent relation, so that the screw threaded shank 40 of the screw 39 may be inserted through said apertures to receive a nut 41; which upon adjustment on the shank 40 may move the ends 37 and 38 together to contract the band 36 about the housing parts 16 and 17, so that the bushings 25 and 26 thereof will be snugly clamped in abutting leak proof engagement with the outer insulated coverings of the cable parts 10 and 11.

Referring to the sealing means E, it is preferred that the nut 41 of the clamping means 35 have an aperture 44 transversely therethrough, for alignment with the longitudinal slot 45 within the screw threaded shank 40, so that a flexible wire 46 may be threaded through the opening 44 and the slot 45 to connect the nut 41 to the bolt 39 in the position in which the clamping means 35 is to be sealed. The ends of the flexible wire 46 are then brought together and connected as by a seal 47. In this manner the connector B for the parts 10 and 11 of the cable C are housed in the compartment in the passageway 20 of the housing D, intermediate the bushings 25 and 26. Incident to the capable manner with which the two parts 16 and 17 may be clamped about the cable C there will be no possibility of longitudinal sliding of the protecting housing upon the cable C, not alone due to the fact that the bushings 25 and 26 snugly engage the parts 10 and 11 of cable C, but also due to the fact that the flattened portions 12 of the cable parts 10 and 11 are transversely enlarged so that there will be no possibility of slipping the same past the bushings 25 and 26, through the passageways 27 and 28 thereof.

The parts 16 and 17 of the housing D, as well as the bushings 25 and 26 may be of some insulating material such as hard rubber, porcelain, fiber, or the like, and may be of any approved shape or formation. Because of the provision of bushings 25 and 26, which may be detachable with respect to the parts 16 and 17 of the housing D, prior to assemblage thereto, it is possible to provide a plurality of bushings 25 and 26 having variable sized openings 27 and 28 therein for a standard size housing D. In this manner the housings of the protecting devices may readily be made to fit conductors of varying sizes.

Referring to the modified form of improved protecting device, the letter G may generally designate the same, which embodies a housing or casing 55 wherein the connector J of the parts 50 and 51 of a cable K may be protected and sealed, as by means M, so that unauthorized tampering therewith can be easily detected.

The connector J is of course of any approved type, such as above described for the preferred embodiment of this invention. The housing or casing 55 is of insulating material, having the ends thereof opened and for the reception of solid bushings 56 and 57. The bushings 56 and 57 are each preferably provided with passageways 58 therein for the accommodation of the cable parts 50 and 51.

The casing 55, as well as the bushings 56 and 57 will have to be positioned upon the cable K prior to the connection of the parts 50 and 51 thereof. The parts 50 and 51 are positioned rather snugly within the openings 58 of the bushings 56 and 57, so that no clamping feature need be provided for this form of invention. Each of the bushings 56 and 57 includes a cylindrical portion 60 for snug fitting within the end of the passageway 61 of the casing 55; a finger engaging knob 62 preferably being provided outwardly of each cylindrical portion 60 to facilitate sliding of the bushing longitudinally upon the cable K.

Referring to the sealing feature of this form of improved protecting device for cable connection it is preferred that the cylindrical portions 60 of the bushings 56 and 57 each be provided with an annular groove 65, which when the bushings are within the ends of the casing 55 are adapted for direct communication with aligning openings 67 and 68, which are tangentially provided at each side of the ends of the casing 55. When the bushings 56 and 57 are in position within the open ends of the casing 55 so that the annular grooves 65 thereof communicate with the apertures 67 and 68, a flexible wire 70 may be threaded through the aligning openings 67 and 68 at each side of the housing 55 and at each end thereof, and the free ends of the wire 70 then brought together and sealed in connected relation as by means 71. In this relation of parts it is obvious that the portions 73 of the wires 70, which extend through the aligning passageways 67 and 68 and through the grooves 65, will prevent any disconnection of the bushings 56 and 57 from the housing 55, without either mutilation of the attaching wire 70, or breaking of the seal 71.

From the foregoing description of this invention it is apparent that an insulating housing or covering for electrical conductor connections has been provided which may be easily and conveniently assembled to the connected ends of cables, as to house in protected manner the connections thereof. The sealing feature of this invention is of primary importance, since the same prevents unauthorized disconnection of the cable parts, in that such disconnection may be readily detected if accomplished.

Various changes in the shape, size, and arrangement of parts may be made to the form of invention herein shown and described, without departing from the spirit of the invention or the scope of the claims.

I claim:

1. In a protecting device for electrical cables, a casing portion adapted to receive an end of a cable part and having an opening through which said cable part extends, a bushing over the cable part and adapted to be detachably connected in the opening of the casing, said bushing having an annular groove therein and said casing having a transverse opening therethrough in communication with the annular groove when the bushing is in said casing opening, and a sealing device including a part adapted to extend through the transverse opening of the casing and into the annular groove of the bushing to prevent detachment of the latter from the casing except through destruction of the sealing device.

2. In a protecting device of the class described a hollow cylindrical casing portion open at an end thereof and having a transverse opening arranged therethrough extending through the passageway of said casing, a sleeve bushing adapted to be placed in the open end of said casing, said bushing having an annular groove exteriorly therein which may be aligned in communicating relation with the transverse opening through said casing, and sealing means for connecting the bushing to the casing including a wire strand adapted to be slipped through the transverse opening into the groove of said bushing, so that the ends of the strand will be placed exteriorly of the casing, and a seal member for connecting the ends of said strand exteriorly of the casing.

3. In an electrical cable connection protector a hollow cylindrical casing open at its ends and having transverse openings therethrough adjacent said ends, and detachable sleeve bushings for insertion in the ends of said casing, said bushings having annular grooves for alignment with the transverse openings of said casing, said bushings including outwardly extending finger projections adapted to extend outwardly of the ends of the casing when the bushings are assembled therein, and holding devices inserted through said aligning transverse openings of the casing and the grooves of the respective bushings.

4. In an electrical cable connection protector a hollow cylindrical casing open at its ends and having transverse openings therethrough adjacent said ends, detachable sleeve bushings for insertion in the ends of said casing, said bushings having annular grooves for alignment with the transverse openings of said casing, said bushings including outwardly extending finger projections adapted to extend outwardly of the ends of the casing when the bushings are assembled therein, wire strands adapted to be inserted through the transverse openings in said casing and into the annular grooves of said bushings, the ends of said strands being brought to a point exteriorly of the casing, and means permanently sealing said ends.

5. In a cable protecting device a hollow substantially cylindrical shaped casing having an open end, said casing having transverse passageways therethrough and which communicate with the open end at opposite sides of the casing, and a hollow bushing for detachable connection in the open end of said casing, said bushing having an annular groove therein adapted to be placed in a communicating relation with the oppositely disposed transverse passageways in said casing, a flexible strand adapted to have the ends thereof threaded through the passageways and into the groove of said bushing, and a sealing member for permanently connecting the ends of the strand exteriorly of the casing.

ORVILLE BUYS.